(12) United States Patent
El-Hassan

(10) Patent No.: US 10,637,590 B2
(45) Date of Patent: Apr. 28, 2020

(54) MILLIMETER WAVE TEST SYSTEMS

(71) Applicant: Apple Inc., Cupertino, CA (US)

(72) Inventor: Wassim El-Hassan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 612 days.

(21) Appl. No.: 15/429,511

(22) Filed: Feb. 10, 2017

(65) Prior Publication Data

US 2018/0048398 A1 Feb. 15, 2018

Related U.S. Application Data

(60) Provisional application No. 62/374,436, filed on Aug. 12, 2016.

(51) Int. Cl.

| | |
|---|---|
| H04B 17/10 | (2015.01) |
| H01Q 3/36 | (2006.01) |
| H01Q 3/26 | (2006.01) |
| H04B 17/14 | (2015.01) |
| H04B 17/00 | (2015.01) |

(52) U.S. Cl.
CPC .......... *H04B 17/101* (2015.01); *H01Q 3/267* (2013.01); *H01Q 3/36* (2013.01); *H04B 17/0085* (2013.01); *H04B 17/14* (2015.01)

(58) Field of Classification Search
None
See application file for complete search history.

(56) References Cited

U.S. PATENT DOCUMENTS

| | | | |
|---|---|---|---|
| 6,236,839 B1 * | 5/2001 | Gu | .......... H01Q 3/267 342/359 |
| 7,602,333 B2 | 10/2009 | Hiramatsu et al. | |
| 7,812,775 B2 | 10/2010 | Babakhani et al. | |
| 7,915,909 B2 | 3/2011 | Dunn et al. | |

(Continued)

OTHER PUBLICATIONS

Fan et al., Low-Cost 60-Ghz Smart Antenna Receiver Subsystem Based on Substrate Integrated Waveguide Technology, IEEE Transactions on Microwave Theory and Techniques vol. 60, No. 4, Apr. 2012 p. 1156-1164 (Year: 2012).*

(Continued)

*Primary Examiner* — Roy Y Yi
(74) *Attorney, Agent, or Firm* — Treyz Law Group, P.C.; Michael H. Lyons

(57) ABSTRACT

An electronic device may be provided with wireless circuitry that handles millimeter wave communications. The wireless circuitry may be tested using a test system that includes a fixture, computing equipment, and a substrate placed in the fixture. The fixture may hold an array of antennas on the substrate at a selected distance from an array of antennas on the wireless circuitry under test. The array on the substrate may receive millimeter wave test signals from the wireless circuitry under test. A transmission line may convey the millimeter wave test signals to a signal analyzer without down-converting the signals. The analyzer and computing equipment may identify performance metric data based on the test signals and may determine whether the wireless circuitry has satisfactory performance based on the performance metric data. The test system may be calibrated using settings that are specific to the design of the wireless circuitry under test.

28 Claims, 9 Drawing Sheets

(56) References Cited

U.S. PATENT DOCUMENTS

| | | | |
|---|---|---|---|
| 2006/0077098 A1* | 4/2006 | Zimmerman | H01Q 3/32 |
| | | | 342/372 |
| 2015/0111507 A1* | 4/2015 | Alpert | H04B 17/21 |
| | | | 455/67.14 |
| 2016/0149312 A1 | 5/2016 | Henry et al. | |
| 2016/0308626 A1 | 10/2016 | Mow et al. | |

OTHER PUBLICATIONS

Boehm, Linus & Boegelsack, Frank & Hitzler, Martin & Wiehler, Stefan & Waldschmidt, Christian. (2016). Accuracy evaluation for antenna measurements at mm-wave frequencies. 1-5. 10.1109/EuCAP.2016.7481972 (Year: 2016).*

Shrivastava et al., "Performance investigations with antipodal linear tapered slot antenna on 60 GHz radio link in a narrow hallway environment", Progress in Electromagnetics Research C 58 (2015): 69-77, <http://jpier.org/PIERC/pierc58/08.15052104.pdf>.

Lamminen et al., "Design and processing of 60 GHz antennas on low temperature co-fired ceramic (LTCC) substrates", Proc. 4th ESA Workshop on Millimetre-Wave Technology and Applications. 2006. <https://www.researchgate.net/profile/Jussi_Saily/publication/228524474_Design_and_processing_of_60_GHz_antennas_on_low_temperature_co-fired_ceramic_LTCC_substrates/links/53e2175f0c124f90fff65b7b8?Design-and-processing-of-60-GHz-antennas-on-low-temperature=co-tired-ceramis-LTCC-substrates.pdf>.

* cited by examiner

MILLIMETER WAVE TEST SYSTEMS

This application claims the benefit of provisional patent application No. 62/374,436, filed Aug. 12, 2016, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave communications bands. Millimeter wave communications, which are sometimes referred to as extremely high frequency (EHF) communications, involve communications at frequencies of about 10-400 GHz. Operation at these frequencies may support high bandwidths, but may raise significant challenges in ensuring satisfactory radio-frequency performance.

Wireless communications circuitry such as millimeter wave circuitry is tested in a test system to ensure adequate radio-frequency performance. In conventional test systems, radio-frequency testing is performed on the communications circuitry after the communications circuitry has been disposed within a fully-assembled electronic device. The millimeter wave communications circuitry is tested by transmitting millimeter wave signals from the fully-assembled electronic device to radio-frequency test equipment in the far field domain (i.e., several meters away from the device).

When performing testing in this manner using conventional test systems, it is difficult to pinpoint whether test failures are attributable to the millimeter wave circuitry or to other components in the electronic device. In addition, the electronic device needs to be disassembled to replace the millimeter wave communications circuitry when a test failure is detected, regardless of whether or not the millimeter wave communications circuitry actually caused the test failure. Disassembling electronic devices in this way can be difficult, time consuming, and cost prohibitive.

It would therefore be desirable to be able provide improved systems and methods for testing millimeter wave communications circuitry.

SUMMARY

An electronic device may be provided with wireless circuitry. The wireless circuitry may include one or more antennas. The antennas may include phased antenna arrays each of which includes multiple antenna elements. The phased antenna arrays may be used to handle millimeter wave wireless communications and may perform beam steering operations.

Performance of wireless communications circuitry for handling millimeter wave communications may be tested and verified using a test system prior to assembling the wireless communications circuitry into a completed device. The test system may include a test fixture, a signal analyzer, computing equipment, and a substrate placed in the test fixture. An array of antennas may be formed on the substrate. The test fixture may hold the array of antennas at a predetermined distance (e.g., less than 1 mm) from an array of antennas on wireless communications circuitry under test. The array of antennas on the substrate may wirelessly receive millimeter wave test signals (e.g., signals at a millimeter wave frequency of greater than 27 GHz) from the array of antennas on the wireless communications circuitry under test. A signal analyzer may be coupled to the substrate by a transmission line. The transmission line may convey the millimeter wave test signals received by the array of antennas on the substrate to the signal analyzer (e.g., the signal analyzer may receive the test signals at the millimeter wave frequency).

The signal analyzer may gather measurement data such as phase and magnitude information from the received millimeter wave test signals. The computing equipment may identify performance metric data such as attenuation and phase discontinuity data based on the gathered measurement data. The computing equipment may determine whether the wireless communications circuitry under test has satisfactory performance based on the performance metric data. If the communications circuitry under test has unsatisfactory performance, the communications circuitry may be discarded or reworked. If the communications circuitry under test has satisfactory performance, the communications circuitry may be further assembled into the electronic device. In order to perform accurate and reliable testing on the wireless communications circuitry under test, the test system may be calibrated using calibration settings that are specific to the particular design of the wireless communications circuitry under test.

The test system may generate the calibration data by loading first and second reference circuits into the test fixture. The first and second reference circuits may be formed on separate substrates (e.g., printed circuit boards). A signal generator in the test system may generate the millimeter wave test signals and may convey the test signals to the first reference circuit. An array of antennas on the first reference circuit may wirelessly transmit the test signals to the second reference circuit. An array of antennas on the second reference circuit may wirelessly receive the test signals from the first reference circuit and may convey the test signals to the signal analyzer.

The signal analyzer and the computing equipment may generate a performance model of the first reference circuit by processing the received test signals. The test system may generate the performance model based on test signals that are transmitted using different combinations of transmit phase shifts (e.g., provided by phase shifters on the first reference circuit), receive phase shifts (e.g., provided by phase shifters on the second reference circuit), frequencies, test signal amplitudes, and/or distances between the antenna arrays on the first and second reference circuits. The calibrated settings may identify a range of phase shift settings for use by the wireless communications circuitry under test and/or by phase shifter circuitry on the substrate during testing. The calibrated settings may identify an optimal distance between the array of antennas on the substrate and the array of antennas on the wireless communications circuitry for use during testing.

DETAILED DESCRIPTION

Figure 1:
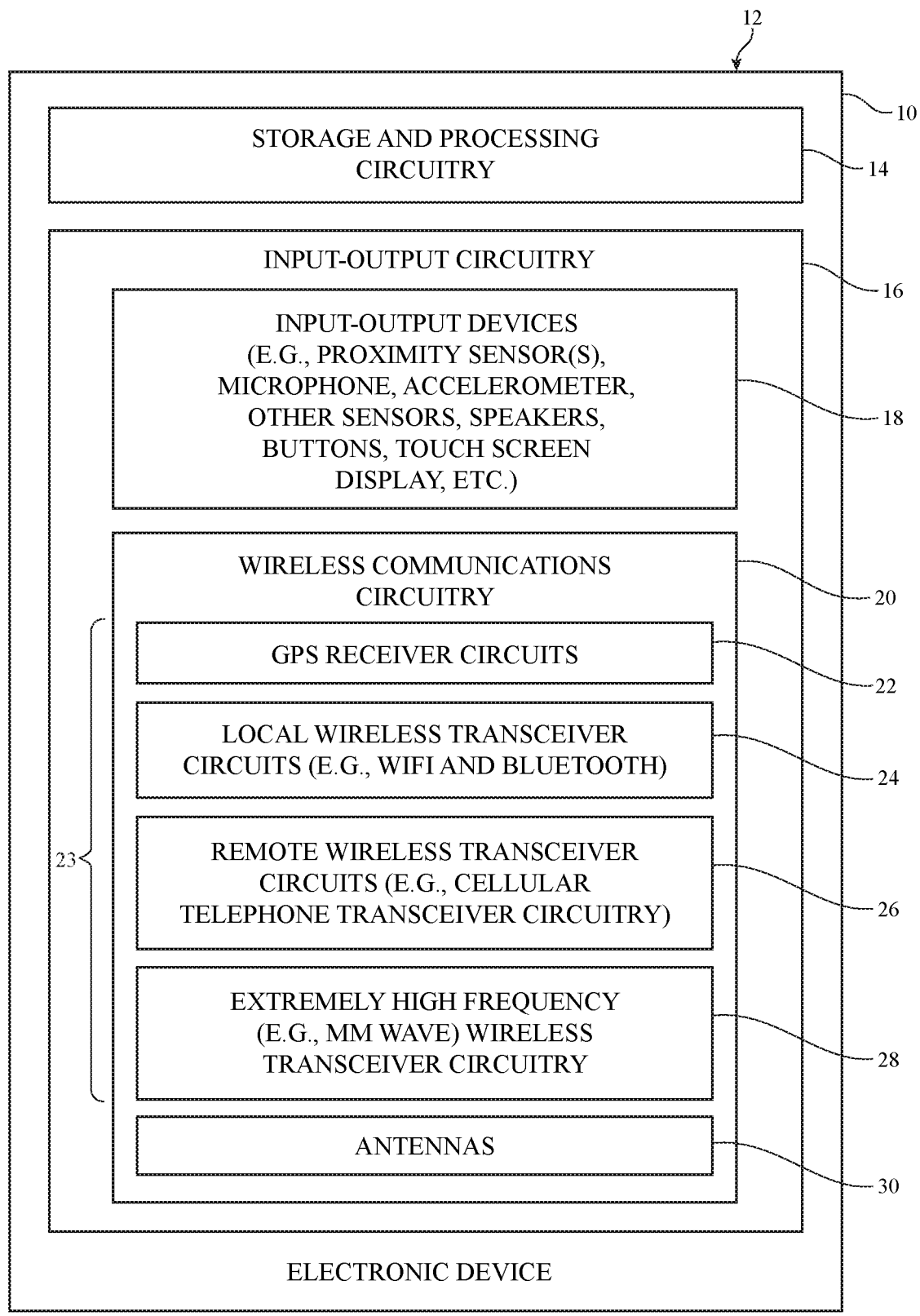
FIG. 1 is schematic diagram of an illustrative electronic device having millimeter wave communications circuitry in accordance with an embodiment.

A schematic diagram showing illustrative components that may be used in an electronic device such as electronic device 10 is shown in FIG. 1. Electronic devices such as electronic device 10 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz, 28 GHz, or other frequencies between about 10 GHz and 400 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may include a housing such as housing 12. Housing 12 may be formed using a unibody configuration in which some or all of housing 12 is machined or molded as a single structure or may be formed using multiple structures (e.g., an internal frame structure, one or more structures that form exterior housing surfaces, etc.). Antennas may be mounted along the peripheral edges of housing 12, on a rear of housing 12, under a dielectric window in a conductive portion of housing 12, or at any other desired location in device 10.

Device 10 may include control circuitry such as storage and processing circuitry 14. Storage and processing circuitry 14 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 14 may be used to control the operation of device 10. This processing circuitry may be based on one or more microprocessors, microcontrollers, digital signal processors, baseband processor integrated circuits, application specific integrated circuits, etc.

Storage and processing circuitry 14 may be used to run software on device 10, such as internet browsing applications, voice-over-internet-protocol (VOIP) telephone call applications, email applications, media playback applications, operating system functions, etc. To support interactions with external equipment, storage and processing circuitry 14 may be used in implementing communications protocols. Communications protocols that may be implemented using storage and processing circuitry 14 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 16 may include wireless communications circuitry 20 for communicating wirelessly with external equipment. Wireless communications circuitry 20 may include radio-frequency (RF) transceiver circuitry formed from one or more integrated circuits, power amplifier circuitry, low-noise input amplifiers, passive RF components, one or more antennas 30, transmission lines, and other circuitry for handling RF wireless signals. Wireless signals can also be sent using light (e.g., using infrared communications).

Wireless communications circuitry 20 may include radio-frequency transceiver circuitry 23 for handling various radio-frequency communications bands. For example, circuitry 20 may include transceiver circuitry 22, 24, 26, and 28.

Transceiver circuitry 24 may be wireless local area network transceiver circuitry that may handle 2.4 GHz and 5

GHz bands for WiFi® (IEEE 802.11) communications and that may handle the 2.4 GHz Bluetooth® communications band.

Circuitry 20 may use cellular telephone transceiver circuitry 26 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 26 may handle voice data and non-voice data.

Millimeter wave transceiver circuitry 28 may support communications at extremely high frequencies (e.g., millimeter wave frequencies from 10 GHz to 400 GHz or other millimeter wave frequencies).

Wireless communications circuitry 20 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry 28 may convey signals over these over these short distances that travel between transmitter and receiver over a line-of-sight path. To enhance signal reception for millimeter wave communications, phased antenna arrays and beam steering techniques may be used. Antenna diversity schemes may also be used to ensure that the antennas that have become blocked or that are otherwise degraded due to the operating environment of device 10 can be switched out of use and higher-performing antennas used in their place if desired.

Wireless communications circuitry 20 can include circuitry for other short-range and long-range wireless links if desired. For example, wireless communications circuitry 20 may include circuitry for receiving television and radio signals, paging system transceivers, near field communications (NFC) circuitry, etc.

Antennas 30 in wireless communications circuitry 20 may be formed using any suitable antenna types. For example, antennas 30 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 30 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 30 can be configured to receive both satellite navigation system signals and signals for other communications bands (e.g., wireless local area network signals and/or cellular telephone signals). Antennas 30 can include phased antenna arrays for handling millimeter wave communications.

Transmission line paths may be used to route antenna signals within device 10. For example, transmission line paths may be used to couple antenna structures 30 to transceiver circuitry 23. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

In some configurations, antennas 30 may include antenna arrays (e.g., phased antenna arrays to implement beam steering functions). For example, the antennas that are used in handling millimeter wave signals for extremely high frequency wireless transceiver circuits 28 may be implemented as phased antenna arrays. The radiating elements in a phased antenna array for supporting millimeter wave communications may be patch antennas, dipole antennas, or other suitable antenna elements. Transceiver circuitry can be integrated with the phased antenna arrays to form integrated phased antenna array and transceiver circuit modules.

Figure 2:
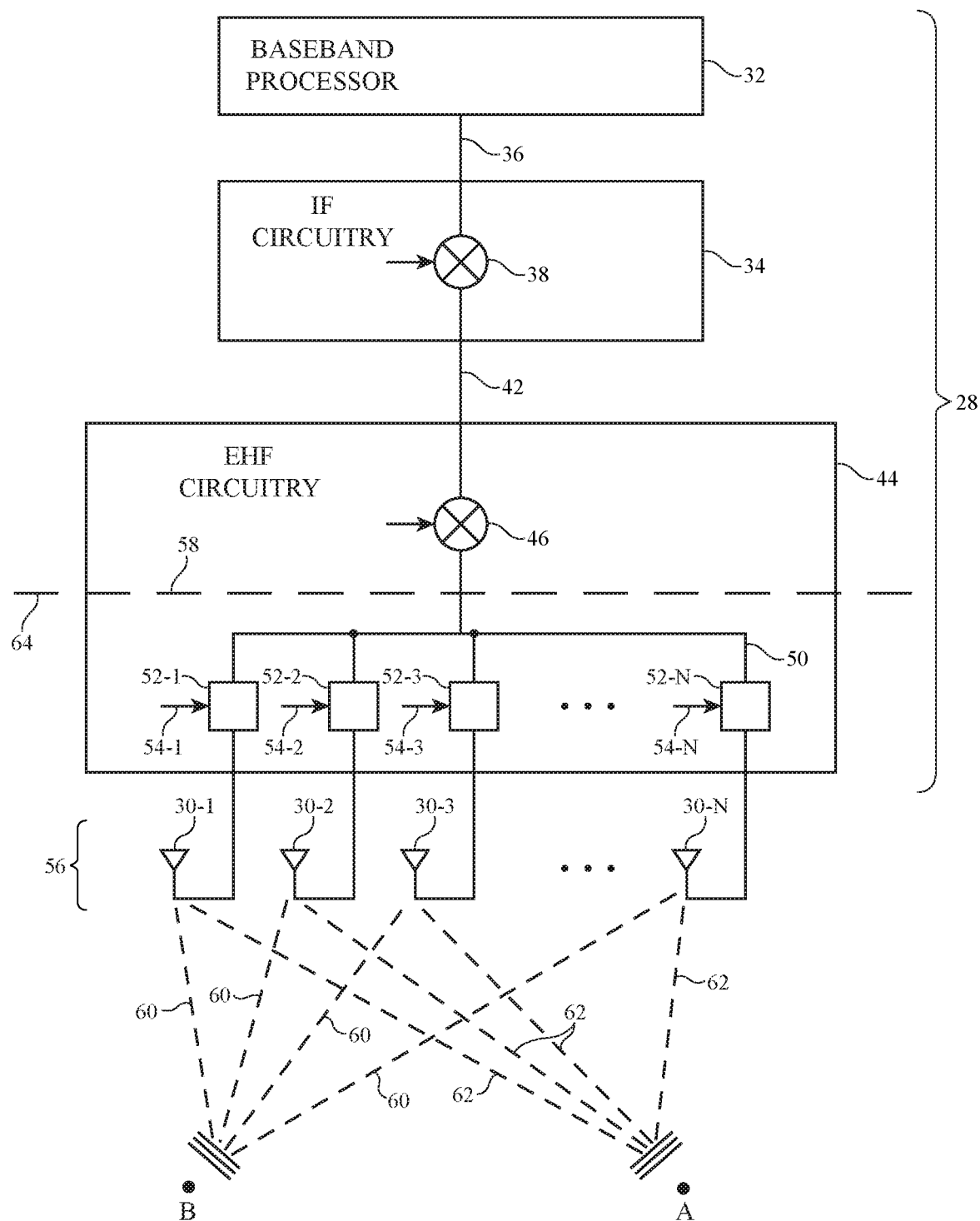
FIG. 2 is a circuit diagram of illustrative millimeter wave communications circuitry for transmitting millimeter wave signals using a phased antenna array in accordance with an embodiment.

FIG. 2 is a diagram of illustrative millimeter wave communications circuitry 28 in device 10 that may perform wireless communications using a phased array of antennas 30. As shown in FIG. 2, millimeter wave communications circuitry 28 may include baseband circuitry such as baseband processor 32, intermediate frequency circuitry such as circuitry 34, and extremely high frequency (EHF) circuitry such as millimeter wave circuitry 44. Millimeter wave circuitry 44 may be coupled to phased array 56 of antennas 30. Array 56 may include a number N of antennas 30 (e.g., a first antenna 30-1, a second antenna 30-2, a third antenna 30-3, etc.). Antennas 30 may be arranged in any desired pattern (e.g., an array having a desired number of rows and columns or in any other desired shape).

Baseband processor 32 may generate baseband data signals (e.g., data signals at a baseband frequency). The data signals may be conveyed to intermediate frequency circuitry 34 over path 36. The data signals may be, for example, in-phase quadrature-phase (I/Q) baseband data.

Intermediate frequency circuitry 34 may up-convert the baseband signals received over line 36 to a corresponding intermediate frequency (IF). For example, mixer circuit 38 may up-convert data received over line 36 to generate intermediate frequency signals at the intermediate frequency. The intermediate frequency may be, for example, between 5 GHz and 10 GHz, between 1 GHz and 5 GHz, or less than 1 GHz. IF circuitry 34 may sometimes be referred to herein as IF transceiver circuitry 34. IF circuitry 34 may include other components (e.g., switching components, filtering components, matching components, transmission line structures, or other components) that operate on the intermediate frequency signals. IF circuitry 34 may convey the intermediate frequency signals to EHF circuitry 44 over line 42.

EHF circuitry 44 may up-convert the intermediate frequency signals received over line 42 to a corresponding millimeter wave frequency (extremely high frequency). For example, mixer 46 may up-convert data received over line 42 to generate EHF (millimeter wave) signals at the millimeter wave frequency. The millimeter wave frequency may be, for example, 28 GHz, 60 GHz, 40 GHz, between 28 GHz and 85 GHz, greater than 85 GHz, greater than 27 GHz, between 27 and 29 GHz, or any other desired millimeter wave frequency. Mixer circuit 46 may pass the EHF signals to phase antennas 30 in array 56 via phase controller circuits 52 and path 50. If desired, circuitry 44 may include other components (e.g., switching components, filtering components, matching components, transmission line structures, or other components) that operate on the EHF signals.

The use of multiple antennas in array 56 allows beam steering arrangements to be implemented by controlling the relative phases of the signals for the antennas. Each antenna 30 in array 56 may be coupled to a corresponding phase controller 52. For example, phase controller 52-1 may be coupled between antenna 30-1 and path 50, phase controller 52-2 may be coupled between antenna 30-2 and path 50, phase controller 52-3 may be coupled between antenna 30-3 and path 50, etc.

Control circuitry 14 may provide control signals 54 to each phase controller to adjust the phase of the EHF signals transmitted by each antenna (e.g., first controller 52-1 may receive control signal 54-1, second controller 52-2 may receive control signal 54-2, third controller 52-3 may receive control signal 54-3, etc.). In this way, phase controllers 52 may serve as phase shifting circuits that shift or adjust the phase of the signals transmitted over path 50. Control circuitry 14 may use phase controllers 52 or any other suitable phase control circuitry to adjust the relative phases of the transmitted EHF signals that are provided to each of the antennas in the antenna array. If, for example, control circuitry 14 adjusts phase shifters 52 to produce a first set of phases on the transmitted EHF signals, the signals transmitted from antennas 30 will form a radio-frequency beam such as beam 60 that is oriented in the direction of point B. If, however, control circuitry 14 adjusts phase controllers 52 to produce a second set of phases on the transmitted EHF signals, the signals transmitted from antennas 30 will form a radio-frequency beam such as beam 62 that is oriented in the direction of point A.

In one suitable arrangement, phase controllers 52 may each include radio-frequency mixing circuitry. Mixing circuitry in phase controllers 52 may receive EHF signals from path 50 at a first input and may receive a corresponding signal weight value from control input 54 (e.g., mixer 52-1 may receive a first weight value, mixer 52-2 may receive a second weight value, etc.). The mixer circuitry may mix (e.g., multiply) the EHF signals received over path 50 by the corresponding signal weight value to produce an output signal that is transmitted on the corresponding antenna. This is merely illustrative. In general, phase shifting circuits 52 may be formed using any desired circuitry that applies a desired phase shift on the signals received over path 50 so that phase shifted signals are provided to antennas 30. The output signals transmitted by each antenna may constructively and destructively interfere to generate a beam of radio-frequency signals in a particular direction (e.g., in a direction as shown by beam 60 or a direction as shown by beam 62).

If desired, baseband processor 32, IF circuitry 34, EHF circuitry 44, and phased antenna array 56 may each be formed on different substrates (e.g., different printed circuit boards, dielectric substrates or carriers, integrated circuits, or other substrates). If desired, one or more of circuits 32, 34, 44, and 56 may be formed on a common (shared) substrate. In one suitable arrangement, EHF circuitry 44 and phased antenna array 56 may be formed on a shared printed circuit or integrated circuit substrate, sometimes referred to herein as a millimeter wave (EHF) module, integrated circuit, or package. Antennas 30 may be formed using traces on the shared substrate or from other structures formed on the shared substrate (e.g., traces on a flexible printed circuit mounted to the shared substrate, metal structures on plastic support blocks placed on a surface of the shared substrate, etc.). If desired, EHF signals may be received by antennas 30 and conveyed to baseband processor 32 via IF circuitry 34 and EHF circuitry 44. Phase shifters 54 may provide a non-zero phase shift or may provide no phase shift to the received signals. Circuitry 46 and 48 may down-convert the received EHF signals to baseband frequencies.

In order to ensure satisfactory radio-frequency performance of EHF circuitry 44 and antenna array 56, radio-frequency test operations (sometimes referred to herein as EHF test operations or millimeter wave test operations) may be performed on EHF circuitry 44 and antenna array 56 by an EHF test system prior to assembling circuitry 44 and 56 into a finished device 10. In practice, the performance of the EHF test systems for testing EHF circuitry 44 and antenna array 56 may be dependent upon the particular design of circuitry 44 and 56. For example, some circuit and antenna designs may have different radiative characteristics than others and may therefore require a different test arrangement than others. If care is not taken (e.g., if the test system is not properly calibrated), EHF signals that are conveyed between the EHF test system and antennas 30 may scatter or be undesirably attenuated. If desired, EHF test systems used to test EHF circuitry 44 and antenna array 56 may be calibrated prior to performing the EHF testing to account of the requirements of the particular design to be tested. After the test system has been calibrated, the test system may be used to perform production testing on millimeter wave circuitry that will later be assembled within the completed device.

Figure 3:
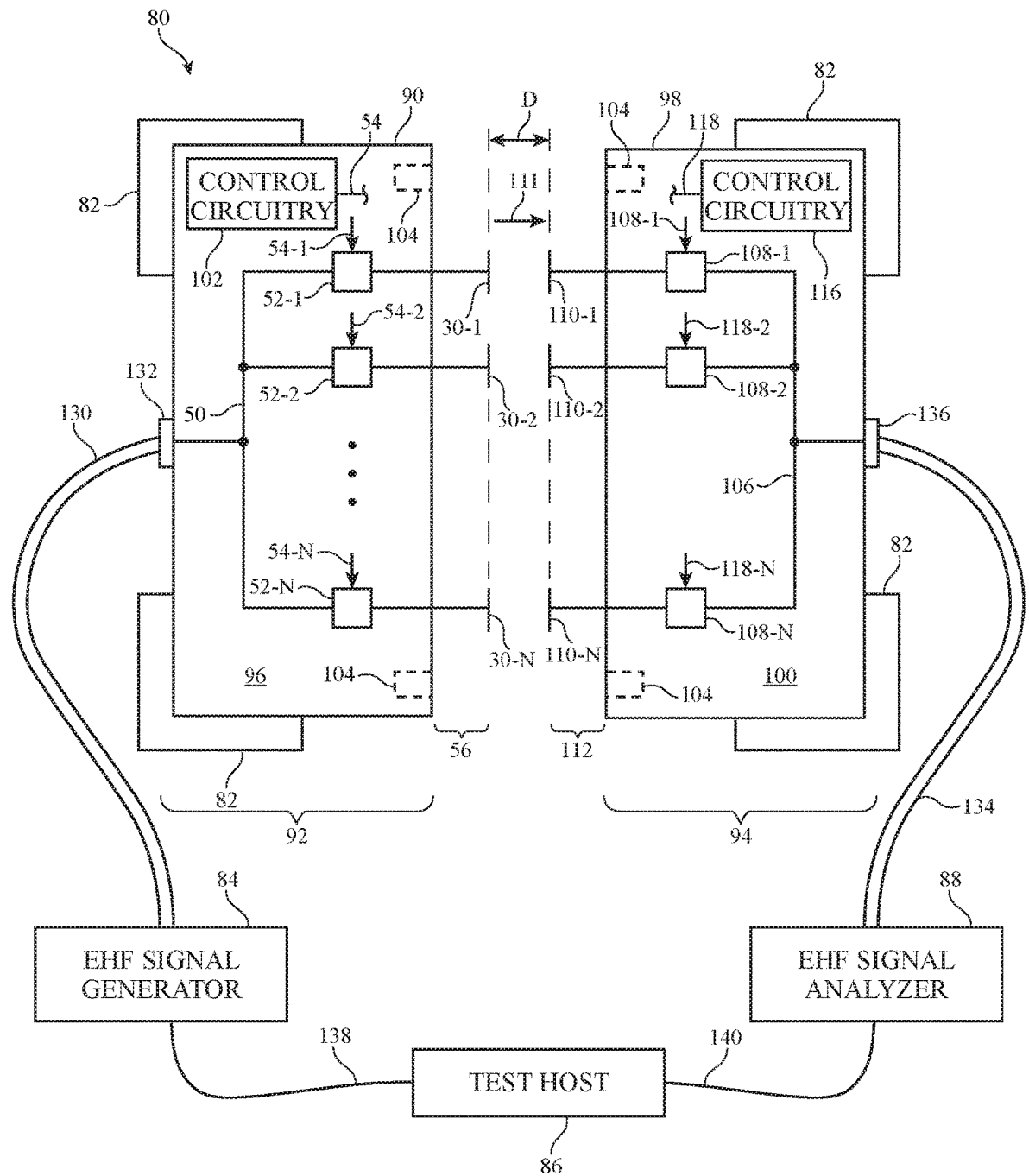
FIG. 3 is a diagram showing how an illustrative test system may be calibrated using a millimeter wave reference circuit in accordance with an embodiment.

FIG. 3 is a diagram of an illustrative EHF test system that can be calibrated to perform EHF testing on circuitry 44 and antenna array 56. As shown in FIG. 3, an EHF (millimeter wave) test system such as test system 80 may include a test fixture 82, an EHF signal generator 84, computing equipment such as test host 86, and an EHF signal analyzer 88.

In order to calibrate test system 80, a prototype for EHF circuitry 44 and antennas 56 may be provided and placed within test fixture 82. In the example of FIG. 3, prototype EHF circuitry 90 is placed within transmit side 92 of test fixture 82. The prototype EHF circuitry may reflect a particular design for circuitry 44 and circuitry 56 that is intended for inclusion in finished device 10. However, prototype 90 may be used only for calibrating system 80 and is not actually used in a finished device 10. Prototype circuit 90 may sometimes be referred to herein as reference circuitry 90 or reference circuit 90 (e.g., because circuit 90 serves as a reference by which to calibrate test system 80).

Reference circuitry 90 may include antenna array 56 and portion of EHF circuitry 44 of transceiver 28. For example, reference circuitry 90 may only include the portion of EHF circuitry 44 that handles EHF signals (e.g., reference circuitry 90 may include the circuitry shown in FIG. 2 below dashed line 64). In other words, reference circuitry 90 may include the components of circuitry 28 prior to assembling or fabricating circuitry 32, 34, and 46 within circuitry 28. By omitting circuitry 32, 34, and 46 from reference 90, the EHF performance of antenna array 56, phase shifters 52, and path 50 may be characterized and verified prior to assembling circuitry 32, 34, and 46 into circuitry 28. This may help to pinpoint any flaws in the design of circuitry 28 prior to further assembly (e.g., so that unnecessary assembly and disassembly of circuitry 28 or device 10 after testing may be avoided, thereby reducing test time and cost).

The components of reference circuitry 90 may be mounted to a common substrate 96. Substrate 96 may, for example, be a rigid or flexible printed circuit board, a semiconductor substrate (e.g., an integrated circuit), a dielectric substrate, or any other desired substrate. Reference circuitry 90 may sometimes be referred to as reference chip 90, reference module 90, or reference package 90.

Antenna array 56 may be mounted to a surface of substrate 96 or otherwise formed on substrate 96. Each antenna 30 in array 56 may be coupled to conductive path 50 via a corresponding phase shifting circuit 52. Conductive path 50 may include, for example, conductive traces, wiring structures, and/or conductive via structures formed on or within substrate 96 (e.g., conductive traces that are configured to convey EHF signals). Phase shifting circuits 52 may be formed on a surface of substrate 96 (e.g., as surface mount components) or embedded within substrate 96. Reference circuitry 90 may include control circuitry 102 (e.g., a microprocessor or other processing circuitry formed on or embedded within substrate 96). Control circuitry 102 may generate control signals 54 that control the phase of phase shifting circuits 52. Switching circuits may be interposed between path 50 and each of phase shifters 52 for selectively activating one or more of antennas 30. The switching circuits may be controlled by control circuitry 102. Reference circuitry 90 may, if desired, include other circuitry (not shown) that operates on signals in the millimeter wave domain.

The particular design of reference circuitry 90 may be duplicated (copied) to generate duplicate reference circuitry 98. Duplicate reference circuitry 98 may be an exact copy of reference circuitry 90. For example, duplicate reference 98 may include conductive traces 106, phase shifting circuits 108, antennas 110 arranged in an array 112 that are duplicates of structures 50, 52, 30, and 56 of reference circuitry 90, respectively. Array 112 may, for example, have the same number N of antennas 110 as array 56 and antennas 110 may be arranged in the same pattern as antennas 30 in array 56 of circuitry 90. Duplicate reference circuitry 98 may include control circuitry (e.g., an embedded microprocessor) 116 that provides control signals 118 that control the phase shift provided by phase shifting circuits 108. Circuitry 116, 108, 50, and 110 may be embedded or formed on a substrate 100 (e.g., a printed circuit board or semiconductor substrate).

Duplicate reference circuitry 98 may be placed within receive side 94 of test fixture 92. Test fixture 82 may include tray structures, holder structures, clamping structures, pinning structures, jig structures, cavity structures, or any other desired structures for holding circuitry 90 and 98 in a fixed position during testing. Test fixtures 82 may hold reference circuitry 90 and duplicate circuitry 98 so that antennas 30 on reference circuit 90 and antennas 110 on duplicate reference circuit 98 are separated by a selected distance D. When placed within fixture 82, each antenna 30 in circuitry 90 may be held distance D apart from a corresponding antenna 110 on circuitry 98 (e.g., antenna 30-1 may be placed distance D apart from antenna 110-1, antenna 30-2 may be placed distance D apart from antenna 110-2, etc.). Test fixture 82 may ensure that each antenna 30 is aligned with the corresponding antenna 110. When held in this way, each antenna 30 may transmit signals by near field coupling to the corresponding antenna 110. Forming reference circuitry 98 as a duplicate of circuitry 90 that is aligned with circuitry 90 may minimize EHF signal scattering between circuitry 98 and 90.

If desired, reference circuitry 90 and/or duplicate reference circuitry 98 may include alignment structures 104. Alignment structures 104 may further ensure that each antenna 30 on circuitry 90 is aligned with a corresponding antenna 110 on circuitry 98 when placed within fixture 82. Alignment structures 104 may include, for example, magnetic structures, pin structures, post structures, interlocking structures, clasp structures, or any other desired alignment structures.

Distance D may be adjusted to tune the EHF performance of test system 80. For example, some distances D may involve more signal attenuation or phase discontinuity (e.g., EHF signal scattering) between antennas 30 and 110 than other distances D. Calibrating test system 80 may identify an optimal distance D such that signal attenuation and phase discontinuity (e.g., EHF signal scattering) is minimized between circuitry 90 and 98. Distance D may, in general, be any distance across which antenna 30 is near field coupled to the corresponding antenna 110. For example, distance D may be any distance that is greater than zero mm and less than an upper limit for signals to be conveyed between antennas 30 and 110 in the near field domain (e.g., any distance greater than zero and less than the wavelength of the signals conveyed between antennas 30 and 110). As an example, distance D may be less than 1.0 mm.

Once reference circuit 90 and duplicate reference circuit 98 have been placed within fixture 82, EHF signal generator 84 may be coupled to circuit 90 via radio-frequency transmission line 130 and radio-frequency connector 132. EHF signal analyzer 88 may be coupled to duplicate circuit 98 via radio-frequency transmission line 134 and radio-frequency connector 136. Transmission lines 130 and 134 may be, for example, coaxial cables or other transmission line structures. Transmission lines 130 and 132, signal generator 84, and signal analyzer 88 may formed separate from (e.g., external to) substrates 96 and 100.

EHF signal generator 84 may be coupled to computing equipment such as test host 86 via communications path 138. EHF signal analyzer 88 may be coupled to test host 86 over communications path 140. Communications paths 138 and 140 may include wired and/or wireless communications paths. Test host 86 may include computing equipment such as a personal computer, laptop computer, handheld or portable computer, or any other desired computing equipment. Test host 86 may be formed separate from (e.g., external to) signal generator 84 and signal analyzer 88. In another suitable arrangement, test host 86, signal generator 84, and/or signal analyzer 88 may be combined into a single testing device. Transmission lines 130 and 134, connectors 132 and 136, test fixture 82, signal generator 84, signal analyzer 88, test host 86, and communications paths 138 and 140 may sometimes be referred to herein collectively as a test station, an EHF test station, test equipment, or EHF test equipment.

A user (e.g., a test operator, manufacturer, or designer of circuitry 28) may control test system 80 using a user input/output interface of test system 80. For example, a user may press buttons in a control panel on generator 84 and analyzer 88 while viewing information that is displayed on a display in test system 80. In computer controlled configurations, test host 86 (e.g., software running autonomously or semi-autonomously on test host 86) may communicate with signal generator 84 and analyzer 88 by sending and receiving control signals and data over paths 138 and 140. Test host 86 may provide control signals such as test commands to signal generator 84 and/or may receive test data from signal analyzer 88 over path 140.

Test host 86 may send test commands to signal generator 84 that instruct signal generator 84 to generate test signals (e.g., EHF test signals having a known phase, frequency, and amplitude). EHF signal generator 84 may generate the EHF test signals (e.g., test signals at a millimeter wave frequency such as 28 GHz, 40 GHz, etc.) based on the test commands and may transmit the EHF test signals to conductor 50 on reference circuitry 90 over transmission line 130 and connector 132. The EHF test signals may then be phase shifted by circuitry 52 and conveyed to a corresponding antenna 30 on reference circuitry 90. Antennas 30 may transmit the EHF test signals to a corresponding antenna 110 on duplicate reference circuitry 98 (e.g., antenna 110-1 may receive EHF test signals transmitted by antenna 30-1, antenna 110-2 may receive EHF test signals transmitted by antenna 30-2, etc.). The received test signals may, if desired, be phase shifted by shifters 108 on duplicate circuitry 98 and conveyed to EHF signal analyzer 88 via path 106, connector 136, and transmission line 134. If desired, connectors 132 and 136 may include radio-frequency coupler circuitry. The radio-frequency coupler circuitry may, for example, be used to measure a phase of the signals transmitted by generator 84 prior to transmission over antennas 30 and a phase of the signals after they are received by antennas 110 and prior to conveying those signals to analyzer 88. This phase information may, for example, be used by analyzer 88 and/or test host 86 to identify a phase difference (e.g., a phase delta) between antennas 30 and 110 that may be used to characterize the performance of system 80 and structures 90. If desired, the coupler circuitry may be interposed at any other desired locations between antennas 30 and signal generator 84 and at any other desired locations between antennas 110 and signal analyzer 88.

The EHF test signals may be conveyed to external signal analyzer 88 without down-converting the signals to a lower frequency (e.g., the test signals may be at millimeter wave frequencies when analyzed by equipment 88). Signal analyzer 88 may analyze the received EHF test signals to extract information about the performance of reference circuitry 98 and 90. For example, analyzer 88 may identify phase and magnitude (amplitude) information from the EHF test signals received from circuitry 98. If desired, analyzer 88 may identify the frequency of the received EHF test signals or any other desired information about the received EHF test signals. Analyzer 88 may convey this information to test host 86 for storage. This information may be processed by test host 86 to generate a model of the EHF performance of reference 90. The model may be used to generate calibration settings for test system 80. The calibration settings may, for example, include a range of phases to be provided by phase shifting circuitry 52, an optimal distance D, and any other desired calibration settings to be used during subsequent EHF testing. For example, the calibration settings may be used by test system 80 in performing EHF testing on production circuitry that is later assembled into completed electronic devices 10.

Figure 4:
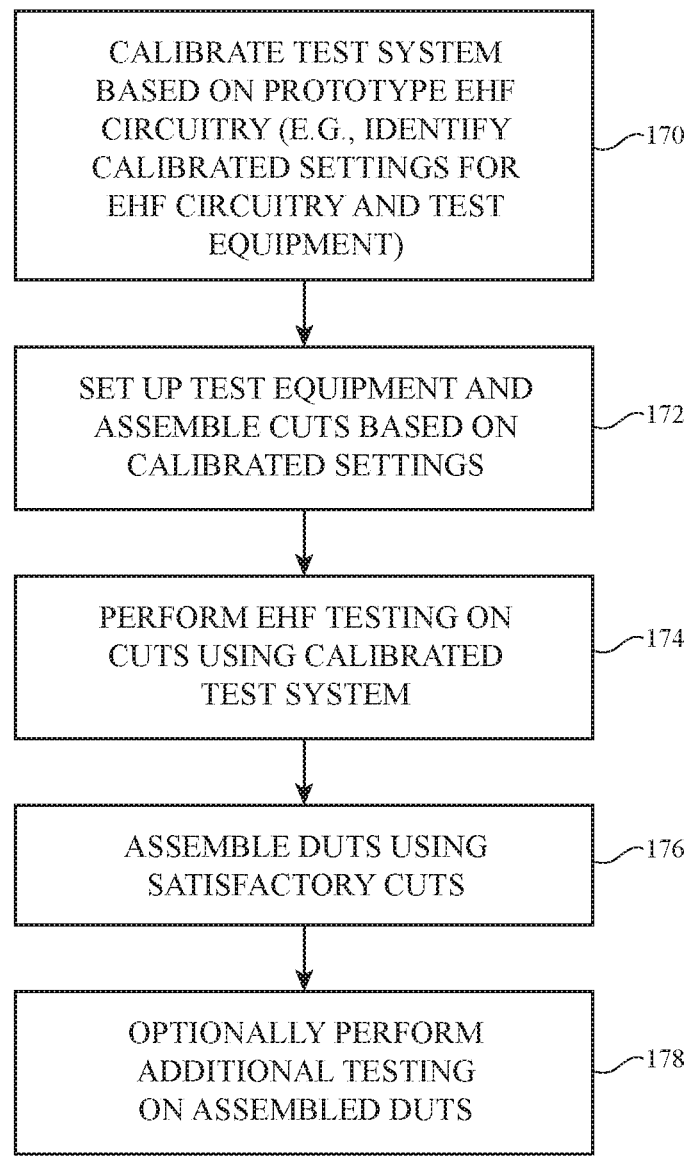
FIG. 4 is a flow chart of illustrative steps that may be performed to test and assemble an electronic device having millimeter wave circuitry in accordance with an embodiment.

FIG. 4 is a flow chart of illustrative steps that may be performed by EHF test system 80 and other manufacturing equipment for verifying satisfactory performance of EHF circuitry 28 prior to assembly of a completed device 10.

At step 170, test system 80 may be calibrated based on reference circuitry 90. Reference circuitry 90 may, for example, incorporate a particular circuitry and antenna design for implementation within device 10. Calibrating test system 80 initializes or sets up test system 80 to perform satisfactory EHF testing on that particular circuitry and antenna design. Test system 80 may generate calibration settings for test system 80 using reference 90 (FIG. 3). The calibration settings may include, for example, phase shift ranges for phase shifting circuitry 52, amplitude settings, frequency settings, and/or an optimal distance D to use for testing circuits having that particular reference design.

At step 172, test system 80 may be set up based on the generated calibration settings. For example, reference circuitry 90 may be removed from fixture 82 and signal generator 84 may be decoupled from test fixture 82. Production circuitry may be assembled that incorporates the particular design of the reference circuitry 90 that was used in processing step 170 and that incorporates the generated calibration settings. For example, the production circuitry may be configured to supply a range of possible phase shifts as identified by the calibration settings. Similarly, phase shifters 108 on duplicate circuitry 98 may be configured to supply the range of possible phase shifts as identified by the calibration settings (e.g., circuitry 98 may duplicate the EHF portion of the production circuitry that is to be tested). The production circuitry may be assembled to include other components in circuitry 28 such as baseband processor 32, IF circuitry 34, and mixer 46. Test fixture 82 may be configured such that, when the production circuitry is placed in fixture 82, the antennas of the production circuitry are located at an optimal distance D (e.g., as specified by the calibration settings) from antennas 110 on duplicate circuitry 98. Each production circuit to be tested in test system 80 may sometimes be referred to herein as a circuit under test (CUT).

At step 174, test system 80 may perform EHF test operations on the assembled CUTs. For example, the CUTs may be placed within test fixture 82 at the optimal distance with respect to antennas 110 on circuitry 98. The CUTs may be controlled to generate EHF test signals that are transmitted to circuitry 98. Circuitry 98 may convey the EHF test signals to signal analyzer 88 without converting the test signals to a lower frequency. Signal analyzer 88 and/or test host 86 may generate performance metric data based on the received EHF test signals. Test host 86 may characterize the performance of the CUTs based on the generated performance metric data. For example, test host 86 may determine whether each CUT has satisfactory EHF performance based on the generated performance metric data. If a particular CUT has unsatisfactory EHF data, that CUT may be reworked, scrapped, re-built, or flagged for review. If a particular CUT has satisfactory EHF performance, another CUT may be loaded for testing.

At step 176, CUTs that were determined to have satisfactory EHF performance (e.g., while processing step 174), may be further assembled within device 10. For example the CUT may be mounted to a common printed circuit board as other transceiver circuits 23 of device 10 and/or may be placed within a housing or form factor of device 10. After a satisfactory CUT has been assembled within the device, additional testing may optionally be performed on the device to ensure that the device has satisfactory performance. Device 10 that is additionally tested after incorporation of the satisfactory CUT may sometimes be referred to herein as a device under test (DUT).

At optional step 178, test system 80 and/or other test equipment may be used to perform additional testing on the assembled DUTs. For example, additional radio-frequency testing or any other desired testing operations may be performed. DUTs that have unsatisfactory performance at this stage (e.g., that fail testing) may be reworked, scrapped, or rebuilt. Because the DUTs have already incorporated satisfactory millimeter wave circuitry 28 at this stage, any test failure of the DUT may be indicative of unsatisfactory performance by components of device 10 other than millimeter wave circuitry 28. Reworking of millimeter wave circuitry 28 (and antenna array 56) may therefore be omitted at this stage, thus reducing the overall time and cost of testing and manufacturing satisfactory devices 10. DUTs that pass the additional testing may, for example, be provided to an end user or customer for normal operation.

Figure 5:
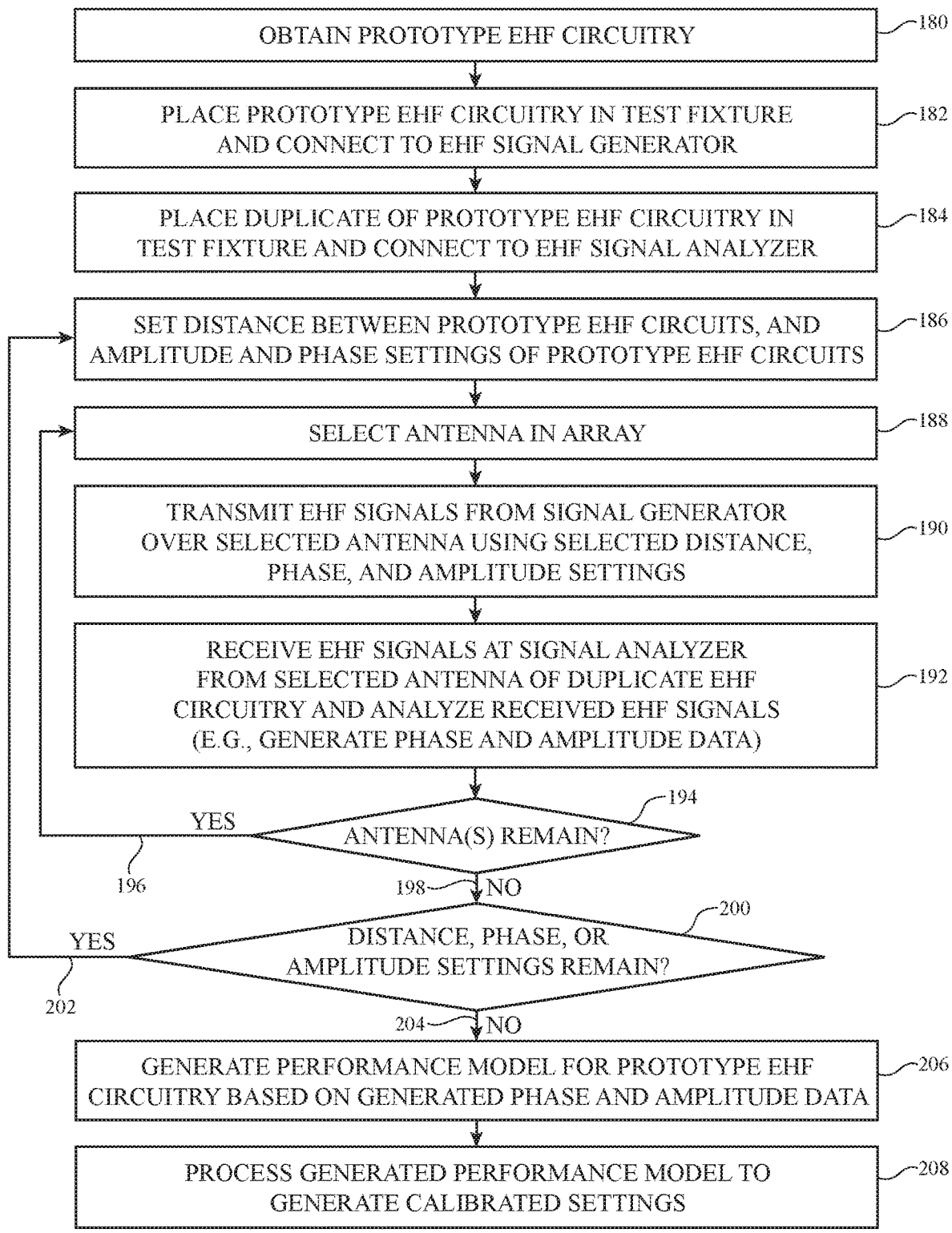
FIG. 5 is a flow chart of illustrative steps that may be performed to calibrate a test system using a millimeter wave reference circuit in accordance with an embodiment.

FIG. 5 is a flow chart of illustrative steps that may be performed by EHF test system 80 (FIG. 3) to calibrate test system 80 (e.g., to generate calibration settings for system 80 that are used to perform EHF testing on production CUTs). The steps of FIG. 5 may, for example, be performed while processing step 170 of FIG. 4.

At step 180, test system 80 may obtain reference EHF circuitry 90. Reference circuitry 90 may incorporate a particular design for antenna array 56 and components 50 and 52. Calibrating test system 80 may account for the particular design of antenna array 56 (e.g., the particular number, type, and arrangement of antennas 30), as well as components 50 and 52 (e.g., so that subsequent EHF testing performed on production circuitry that incorporates the design of reference 90 can be considered reliable). If desired, reference circuitry 90 may be provided by manufacturing equipment (e.g., assembly or fabrication equipment that fabricates circuitry 90). Reference circuitry 90 may, for example, include the EHF portion of millimeter wave transceiver circuitry 28 as shown in FIG. 2 (e.g., the portion of FIG. 2 below dashed line 64).

At step 182, reference circuit 90 may be placed within transmit portion 92 of test fixture 80. EHF signal generator 84 may be connected to reference circuit 90 using transmission line 130 and connector 132 (e.g., connector 132 may be coupled to trace 50 on reference circuit 90).

At step 184, a duplicate 98 of reference circuitry 90 may be obtained. Duplicate circuitry 98 may be provided by manufacturing equipment if desired (e.g., the same fabrication equipment used to produce reference circuit 90). Duplicate reference circuit 98 may be placed within receive portion 94 of test fixture 82. EHF signal analyzer 88 may be connected to duplicate reference circuit 98 using transmission line 134 and connector 136 (e.g., connector 136 may be coupled to trace 106 on duplicate circuit 98).

At step 186, test fixture 82 may be set so that transmit antennas 30 are located at a distance D away from receive antennas 110 (e.g., and so that each transmit antenna 30 is aligned with a corresponding antenna 110 on duplicate circuit 98). If desired, alignment structures 104 may help to ensure proper alignment between the antennas of circuits 90 and 98. Signal generator 84 may generate EHF signals having a selected frequency, amplitude (magnitude), and phase. For example, test host 86 may instruct generator 84 to generate the test signals at the selected frequency, amplitude, and phase.

At step 188, control circuitry 102 on reference circuit 90 and control circuitry 116 on duplicate reference circuit 98 may select a desired antenna in arrays 56 and 112, respectively. The antenna selected in array 56 may be aligned with the antenna selected in array 112. For example, control circuitry 102 may select antenna 30-1 for transmission whereas control circuitry 116 selects antenna 110-1 for reception. Control circuitry 102 may select the transmit antenna by, for example, closing (activating) a switch coupled between path 50 and phase shifter 52-1 and opening (deactivating) switches coupled between path 50 and the other phase shifters in reference circuit 90. Similarly, control circuitry 116 may select the receive antenna by, for example, closing a switch coupled between path 106 and phase shifter 108-1 and opening switches coupled between path 106 and the other phase shifters in duplicate reference circuit 98. Control circuitry 102 and 116 may select the antennas based on stored test instructions or based on test commands received from test host 86 over wired or wireless control paths (not shown). The phase shifter circuits of the selected antennas may be set (e.g., using control signals 54 or 108) to provide a selected phase shift to the transmitted and received EHF test signals.

At step 190, the EHF test signals generated by EHF signal generator 84 may be conveyed to reference circuit 90 over path 130, 132, and 50. The phase shifter coupled to the selected antenna may provide the selected phase shift to the EHF test signals transmitted by signal generator 84. That phase shifter may convey the phase shifted EHF test signals to the corresponding antenna 30 in array 56. For example, when antenna 30-1 is selected, phase shifter 52-1 may apply a selected phase shift to the EHF test signals and may convey the phase-shifted EHF test signals to antenna 30-1. Antenna 30-1 may transmit the phase shifted EHF test signals to antenna 110-1 on duplicated reference circuit 98 via near field electromagnetic radiation (e.g., as shown by arrow 111).

At step 192, signal analyzer 88 may receive the transmitted EHF test signals via the selected antenna 110, the corresponding phase shifter 108, path 106, connector 136, and transmission line 134. For example, when antenna 110-1 is selected, antenna 110-1 may receive the phase shifted EHF test signals transmitted by antenna 30-1 and may convey the test signals to phase shifter 108-1. Phase shifter 108-1 may perform a selected phase shift on the received signals and may convey the phase-shifted signals to analyzer 88 over path 106, 136, and 134.

Signal analyzer 88 may analyze the EHF test signals received from duplicate circuit 98. For example, signal analyzer 88 may identify a phase and magnitude of the EHF test signals. Signal analyzer 88 may pass the phase and magnitude data to test host 86. Test host 86 may store the phase and magnitude data for subsequent analysis. Test host 86 may, if desired, determine performance metric data such as an attenuation value of the EHF test signals for the selected antenna and the selected settings. The attenuation value may be calculated by, for example, identifying a difference between the magnitude of the EHF test signals transmitted by generator 84 and the magnitude of those EHF test signals after being received at signal analyzer 88. Similarly, test host 86 may identify phase discontinuities associated with the EHF test signals for the selected antenna and the selected settings. Test host 86 may identify the phase discontinuities by, for example, computing a difference between the expected phase of the signals transmitted by antennas 30 (e.g., based on the known phase of the signal transmitted at generator 84 and the known phase shift provided by phase shifter 52) and the received phase measured at analyzer 88. If desired, analyzer 88 and test host 86 may identify other information such as frequency discontinuities between the transmitted and received EHF test signals.

At step 194, controllers 102 and 116 may determine whether antennas remain in arrays 56 and 112 for processing. If antennas remain, processing may loop back to step 188 as shown by path 196 to select a different antenna for transmitting the EHF test signals. If no antennas remain, processing may proceed to step 200 as shown by path 198. By conveying EHF test signals over a single antenna at a time, accurate phase and magnitude information may be recorded for each antenna in the arrays without a risk of interference between multiple antennas on each array. Conveying EHF test signals over a single antenna at a time may also allow test system 80 to pinpoint any individual antennas having unsatisfactory EHF performance.

At step 200, test host 86 may determine whether distance, phase, or amplitude settings remain for processing. If distance, phase, or amplitude settings remain, processing may loop back to step 186 as shown by path 202. EHF test signals may then be re-transmitted using additional phase shifts applied by phase shifting circuits 52 and/or 108, using additional amplitudes, and/or using different distances D. For example, test fixture 82 may be adjusted to reduce or increase distance D to gather additional phase and magnitude data from the transmitted EHF test signals. In this way, test system 80 may gather phase and magnitude information for EHF test signals transmitted and received using any desired (e.g., every possible) combination of phase shifts provided by transmit phase shifters 52 and/or receive phase shifters 108, distances D, and EHF test signal amplitudes. This data may be stored at test host 86 for subsequent processing. If no combinations of phase shifter settings, amplitude settings, and distance settings remain, processing may proceed to step 206 as shown by path 204.

At step 206, test host 86 may process the stored phase and magnitude measurements generated by analyzer 88 from the transmitted EHF test signals. For example, test host 86 may generate a performance model for the particular design of reference circuit 90 based on the measured phase and amplitude data. The model may, for example, model the EHF performance of that particular design of circuitry 90.

At step 208, test host 86 may analyze the generated model (e.g., as generated by processing step 206) to generate calibration settings for test system 80. For example, test host 86 may analyze the generated model to identify a range of acceptable phase shift settings for phase shifting circuitry 52 and/or 108 (e.g., when incorporated into the design reflected by reference 90). In addition, test host 86 may analyze the generated model to identify an optimal distance D.

The range of acceptable phase shift settings and the optimal distance D may be, for example, phase shift settings and a distance setting that generated a minimum amount of attenuation for the EHF test signals and/or a minimum amount of phase discontinuity between antennas 30 and 110. For example, a first set of phase shift settings and a first distance D may result in a greater amount of signal attenuation and phase discontinuity for the EHF test signals when received at analyzer 88 than a second set of phase shift settings and a second distance D. By minimizing attenuation and phase discontinuity, the reliability of any subsequent testing performed by test system 80 may be maximized. The second distance D may then be used as calibration settings for any subsequent testing of circuits having the design of reference circuit 90.

If desired, the steps of FIG. 5 may be repeated for different frequencies of EHF test signals (e.g., because the performance of system 80 may vary based on the frequency of operation) and for other designs of reference circuit 90. Similar operations may also be used to identify optimal amplitudes and/or frequencies for the EHF test signals. The example of FIG. 5 is merely illustrative. If desired, step 188 may be performed prior to step 186 (e.g., a range of different amplitude and phase settings may be attempted for each antenna before moving on to the next antenna).

Once calibration settings have been obtained for test system 80 (e.g., for a particular design of reference circuit 90), signal generator 84 may be decoupled from reference circuit 90 and reference circuit 90 may be removed from test system 80. The design of reference circuit 90 may then be used to generate production circuits to be tested using test system 80 (e.g., additional modules incorporating the design of reference circuit 90 may be fabricated). The production circuits may include circuitry 50, 52, and 56 of reference circuit 90 after being further assembled with the remainder of millimeter wave transceiver circuitry 28. For example, the production circuits may further include circuitry 32, 34, and 46 of FIG. 2. Each assembled production circuit may sometimes referred to herein as a circuit under test (CUT). Further radio-frequency testing may be performed on the CUTs to ensure satisfactory performance of each CUT prior to assembling the CUTs into corresponding devices 10 (e.g., while processing step 174 of FIG. 4). Each CUT may potentially be used in a completed device 10 (e.g., if that CUT has satisfactory EHF performance), whereas reference circuit 90 is only used to calibrate test system 80 and is not included in any completed device 10.

Figure 6:
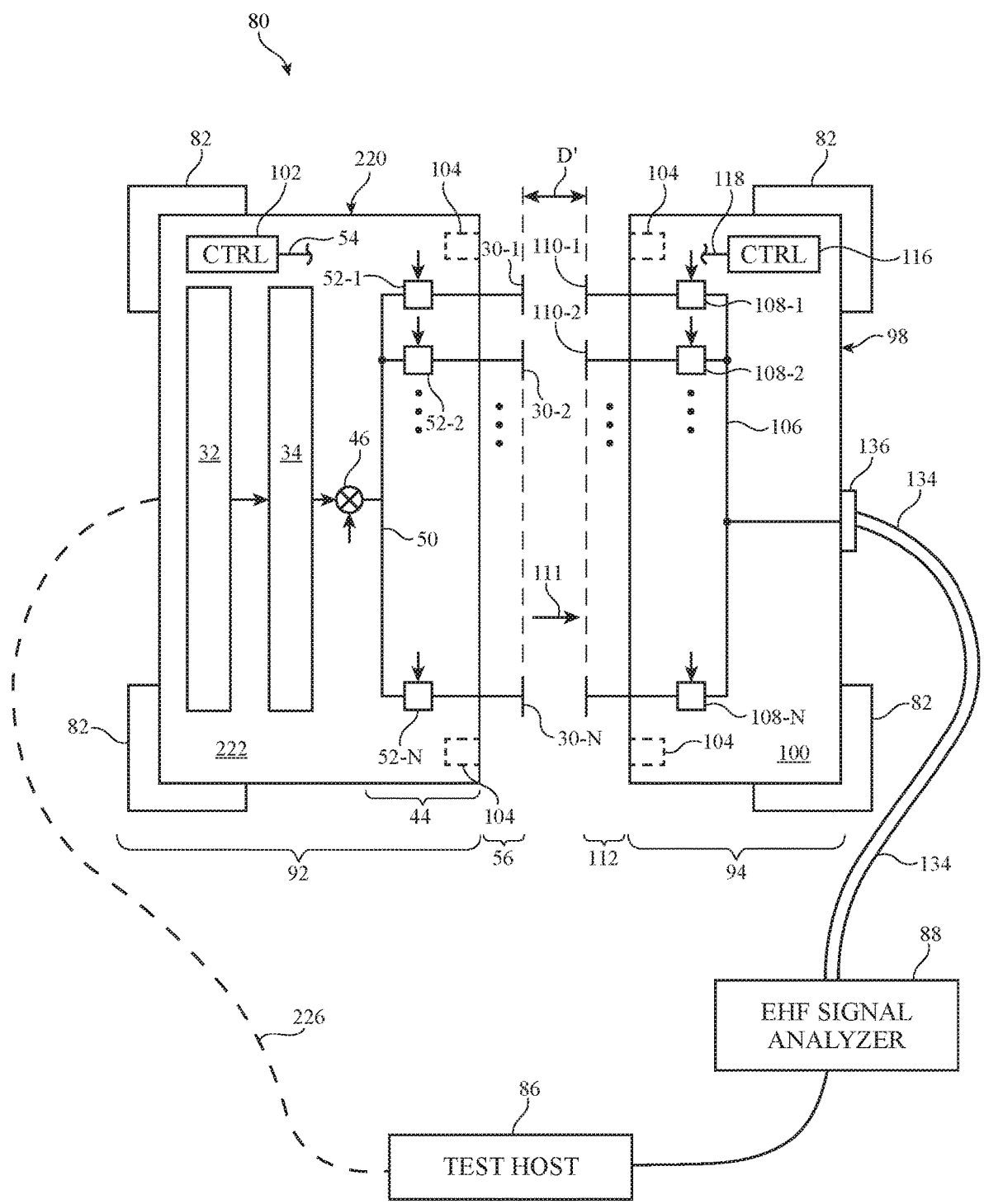
FIG. 6 is a diagram showing how an illustrative calibrated test system may perform testing operations to ensure satisfactory performance of millimeter wave communications circuitry in accordance with an embodiment.

FIG. 6 is a diagram of test system 80 when loaded with a CUT for performing EHF testing on the CUT. As shown in FIG. 6, CUT 220 may be loaded into transmit side 92 of test fixture 82. Test system 80 of FIG. 6 may be, for example, the same test system used to generate the calibration settings or may be a different test system (e.g., located at another geographic location) that includes similar equipment. Control circuitry 102 of CUT 220 may be configured using the calibration settings generated while processing step 170 of FIG. 4 to control phase shifting circuits 52 to provide a predetermined range of possible phase shifts. Control circuitry 116 may be configured using the calibration settings to control phase shifting circuits 108 to provide the same predetermined range of possible phase shifts as control circuitry 102.

After placing CUT 220 within test fixture 82, test fixture 82 may be closed to place antennas 30 of CUT 220 at an optimal distance D' from antennas 110 of duplicate reference circuit 98 (e.g., as identified in the calibration settings generated at step 170 of FIG. 4). If desired, the calibration settings may identify an acceptable tolerance for distance D'. Test fixture 82 may hold antennas 30 and 110 apart by the optimal distance D' plus or minus the identified acceptable tolerance. When incorporated into calibrated test system 80, duplicated reference circuit 98 may sometimes be referred to as a test head or probe that is used to perform EHF testing on CUT 220. If desired, alignment structures 104 on CUT 220 and/or test head 98 may ensure that each antenna 30 is aligned with (e.g., substantially or completely aligned with) a corresponding antenna 110.

As shown in FIG. 6, CUT 220 may include baseband circuitry 32, intermediate circuitry 34, and a complete EHF circuitry 44 (e.g., including mixer 46). Circuitry 32, 34, 44, and 56 may be mounted to a common substrate 222. Substrate 222 may be, for example, a printed circuit board, integrated circuit, module, or package. In one suitable arrangement, substrate 222 is a main logic board for device 10.

Test host 86 may be coupled to CUT 220 via communications path 226. Communications path 226 may be, for example, a wired or wireless communications path between test host 86 and baseband processor 32 and/or control circuitry 102. When generating the calibration settings, signal generator 84 is used to generate the EHF test signals (e.g., no up-conversion, baseband, or intermediate circuitry is formed on reference circuit 90). When performing testing on CUT 220, CUT 220 may generate the EHF test signals itself and signal generator 84 may be disconnected from fixture 82.

If desired, test host 86 may load test software (instructions) onto CUT 220 over path 226 and/or may convey test commands to CUT 220 over path 226. For example, test host 86 may instruct CUT 220 to generate EHF test signals.

Baseband circuitry 32 may generate baseband test signals that are up-converted to an intermediate frequency by circuitry 34. Mixer 46 may generate the EHF test signals by up-converting the test signals from the intermediate frequency to a millimeter wave frequency (e.g., 28 GHz). The test signals may be conveyed over antennas 30. Phase shifters 52 may provide a desired phase shift to the EHF test signals prior to transmitting the phase-shifted test signals over antennas 30. The phase shifts provided by shifters 52 may, for example, be within the range of phase shifts identified in the calibration settings for test system 80.

Test head 98 may receive the EHF test signals transmitted antennas 30 on CUT 220. Test head 98 may, if desired, apply a phase shift to the received test signals using shifter circuits 108 (e.g., within the range of phase shifts identified by the calibration settings). The EHF test signals may be conveyed to signal analyzer 88 over path 106, connector 136, and transmission line 134. Signal analyzer 88 may measure phase, magnitude, attenuation, phase shift or discontinuity information, or any other desired information from the received EHF test signals. Test host 86 and/or signal analyzer 88 may generate performance metric data associated with the performance of CUT 220 using the measurements gathered by analyzer 88. Test host 86 may process the generated performance metric data to determine whether or not that particular CUT 220 has satisfactory EHF performance. If CUT 220 has satisfactory EHF performance, that CUT may be further assembled within device 10. If CUT 220 has unsatisfactory performance, that CUT may be scrapped or reworked.

The example of FIG. 6 in which CUT 220 transmits the EHF test signals is merely illustrative. If desired, the receive performance of CUT 220 may be tested. In this scenario, test head 98 may be replaced by CUT 220 on receive side 94 of test fixture 82. Signal generator 84 and reference circuit 90 may then transmit EHF test signals to CUT 220. Processing circuitry on CUT 220 or signal analyzer 88 and test host 86 may generate performance metric information based on the received EHF test signals for determining whether CUT 220 has satisfactory EHF performance.

Figure 7:
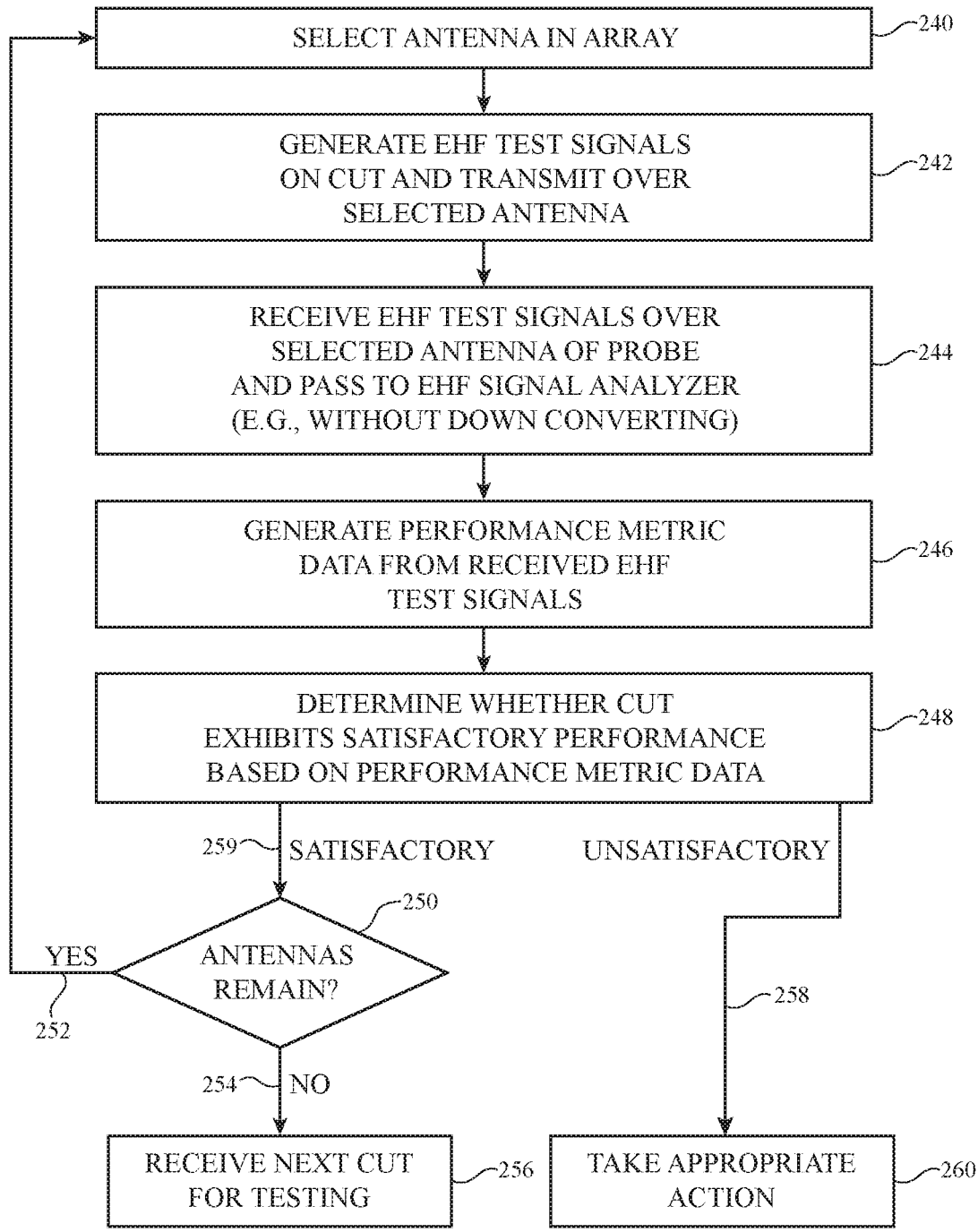
FIG. 7 is a flow chart of illustrative steps that may be processed by a calibrated test system to perform testing operations on millimeter wave communications circuitry in accordance with an embodiment.

FIG. 7 is a flow chart of illustrative steps that may be processed by calibrated test system 80 (as shown in FIG. 6) to perform EHF testing on CUT 220 (e.g., after CUT 220 has been loaded into test fixture 82 and held at an optimal distance D' from antennas 110 on circuitry 98). The steps of FIG. 7 may, for example, be performed while processing step 174 of FIG. 4.

At step 240, control circuitry 102 may select an antenna in array 56. Control circuitry 102 may close a switch between path 50 and the phase shifter 52 coupled to the selected antenna and may open switches coupled between path 50 and the remaining phase shifters 52. Similarly, control circuitry 116 may select an antenna in array 112 that is aligned with the selected antenna 30. Control circuitry 116 may close a switch between the phase shifter 108 corresponding to the selected antenna and may open switches coupled between path 50 and the remaining phase shifters 108. For example, control circuitry 102 may select antenna 30-2 whereas control circuitry 116 selects antenna 110-2. Control circuitry 102 and 116 may select the antenna based on stored test instructions (code) and/or based on test commands received from test host 86.

At step 242, CUT 220 may generate EHF test signals. For example, baseband processor 32 may generate baseband test signals, intermediate frequency circuitry 34 may up-convert the baseband test signals to intermediate frequency test signals, and mixer 46 may up-convert the intermediate frequency test signals to EHF test signals. The EHF test signals may be transmitted over the selected antenna 30 after being phase shifted by the corresponding phase shifter 52. Baseband circuitry 32 may generate the baseband test signals based on test instructions stored on controller 102 and/or based on test commands received from test host 86.

At step 244, EHF test head 98 may receive the transmitted EHF test signals over the selected antenna 110. The received EHF test signals may be phase shifted using the corresponding phase shifter 108 if desired. The received EHF test signals may be conveyed to analyzer 88 over path 106, connector 136, and transmission line 134. EHF signal analyzer 88 may measure phase, magnitude, frequency, phase shift or discontinuity information, attenuation information, or any other desired information from the received EHF test signals (e.g., equipment 88 may perform measurements in the EHF domain).

At step 246, test host 86 and/or analyzer 88 may use the measured information to generate corresponding performance metric information that characterizes the EHF performance of that CUT 220. In some scenarios, the performance metric information may be the attenuation and/or phase shift/discontinuity information. In general, any desired performance metric for characterizing the EHF performance of CUT 220 may be used.

At step 248, test host 86 may determine whether CUT 220 exhibits satisfactory EHF performance based on the generated performance metric data. The EHF performance may be considered satisfactory if, for example, the generated performance metric data falls within a range of acceptable performance metric values (e.g., the performance metric data has a magnitude that is greater than a minimum acceptable performance metric threshold and/or that is less than a maximum acceptable performance metric threshold). The performance metric thresholds may, for example, be determined by manufacturer requirements, regulatory standards, standards set by the designer of circuitry 220, or any other desired threshold.

If test host 86 determines that CUT 220 has unsatisfactory EHF performance, processing may proceed to step 260 as shown by path 258. At step 260, test system 80 may take suitable action. For example, that CUT 220 may be labeled as "failing" testing, may be discarded, or may be reworked. As an example, in scenarios where the performance metric information includes attenuation information, high levels of attenuation of the EHF test signals (e.g., attenuation greater than a minimum acceptable attenuation threshold value) may be indicative of poor or unsatisfactory EHF performance of CUT 220. As such, if an attenuation value is generated for CUT 220 that exceeds the minimum acceptable threshold, that CUT 220 may be labeled as failing testing and may be reworked.

If test host 86 determines that CUT 220 has satisfactory EHF performance, processing may proceed to step 250 as shown by path 259. At step 259, controllers 102 and 116 may determine whether antennas 110 and 30 remain for processing. If antennas remain, processing may loop back to step 240 as shown by path 252 to test the EHF performance of the remaining N antennas on CUT 220. By testing each antenna 30 at a given time, interference between different antennas 30 in array 56 may be prevented and reliable performance metric data may be gathered. In addition, individual antennas 30 that fail EHF testing may be identified if desired.

When all N antennas 30 have been tested and satisfactory EHF performance has been verified for each antenna 30 of CUT 220, CUT 220 may be labeled as "passing" testing and processing may proceed to step 256. CUTs 220 that pass testing may be further assembled within completed devices 10. At step 256, a new CUT 220 may be loaded into fixture 82 for testing (e.g., the steps shown in FIG. 7 may be repeated for each CUT). In this way, the EHF performance of entire batches of CUTs that incorporate the design of reference circuit 90 may be tested. If desired, multiple test stations 80 may test CUTs 220 in parallel (e.g., in a manufacturing environment), thereby increasing overall test speed.

Figure 8:
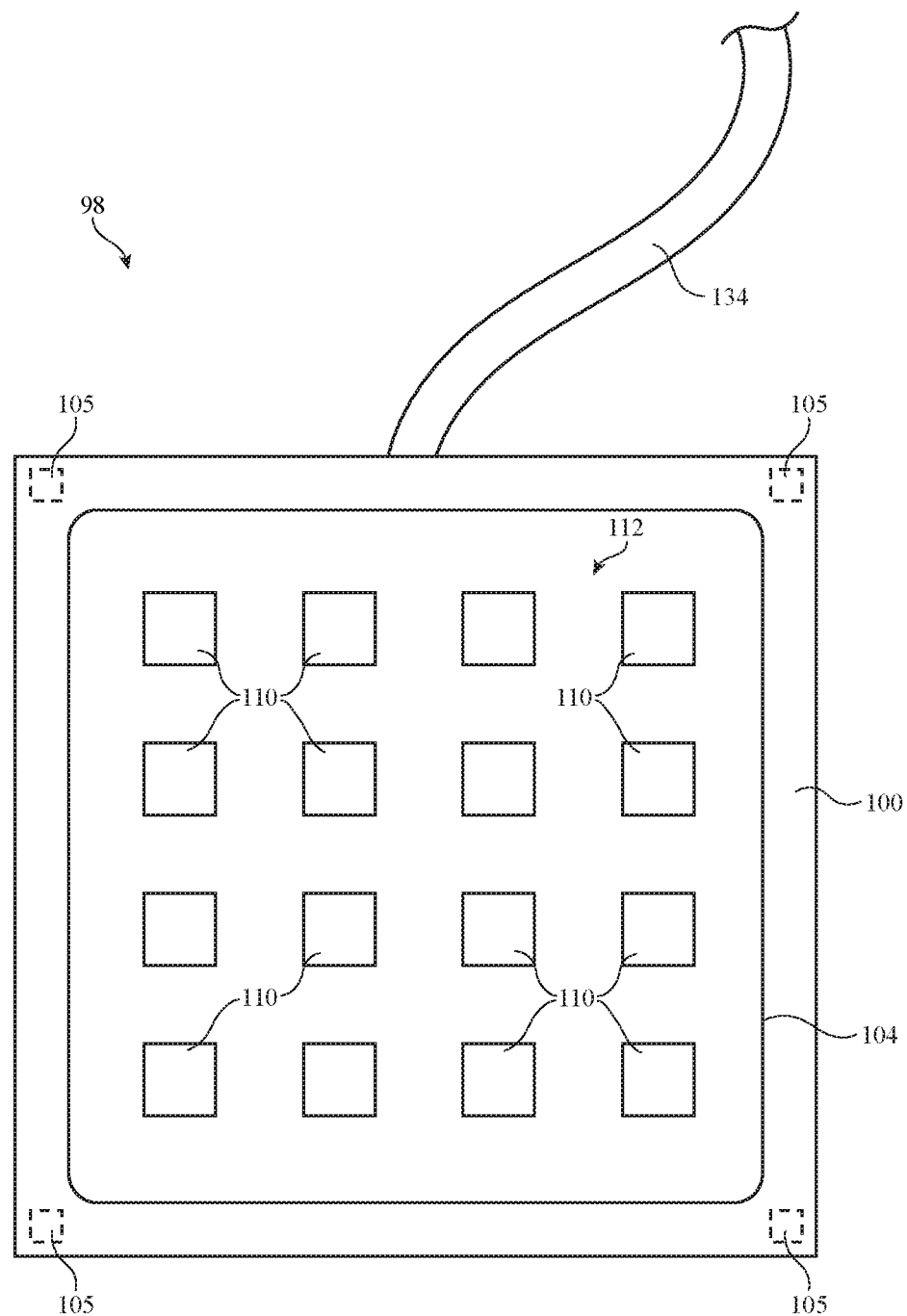
FIG. 8 is a front view of an illustrative test head for calibrating a millimeter wave test system and for performing test operations on millimeter wave communications circuitry in accordance with an embodiment.

FIG. 8 is a top-down view of circuitry 98 of test system 80 (e.g., in the direction of arrow 111 of FIGS. 3 and 6). Test head 98 may be used to generate calibration settings for test system 90 (e.g., as shown in FIG. 3 and while processing step 170 of FIG. 4) and/or may be used to perform EHF testing on CUTs 220 (e.g., as shown in FIG. 6 and while processing step 174 of FIG. 4).

As shown in FIG. 8, array 112 of antennas 110 may be formed on a front face of substrate 100 of test head 98. Transmission line 134 may convey EHF signals received by antennas 110 to analyzer circuitry 88. Antennas 110 may be arranged in a grid (array) of rows and columns, or may be arranged in any other desired pattern or shape. Antennas 110 are shown in FIG. 8 as being rectangular patch antennas but, in general, antennas 110 may each have any desired shape and may each be any desired type of antenna. Each antenna 110 may be identical or two or more of antennas 110 may be different (e.g., as long as each antenna 110 is identical to and aligns with a corresponding antenna 30 on CUT 220 or reference circuit 90 when loaded into fixture 82).

Alignment structures 104 may be formed on the front face of substrate 100. In one suitable arrangement, alignment structures 104 are magnetic structures such as a permanent magnet that is attracted to magnetic or conductive alignment structures 104 on CUT 220 or reference circuit 90. In the example of FIG. 8, alignment structure 104 is a permanent magnet that surrounds all of the antennas 110 in array 112. This type of arrangement may, for example, provide a high degree of alignment between each antenna 110 and a corresponding antenna 30 when placed in test fixture 82. This is merely illustrative. If desired, alignment structure 104 may surround some but not all of antennas 110 or may have any other desired shape. For example, alignment structure 104 may be formed from separate structures adjacent to the edges of substrate 100 such as at locations 105. Alignment structure 104 may, if desired, be interspersed among antennas 110 in array 112. CUT 220 and/or reference circuit 90 may have an arrangement similar to that shown in FIG. 8, or alignment structures 104 on CUT 220 and reference circuit 90 may be different from alignment structures 104 on test head 98. In general, substrate 100 may have any desired shape.

Figure 9:
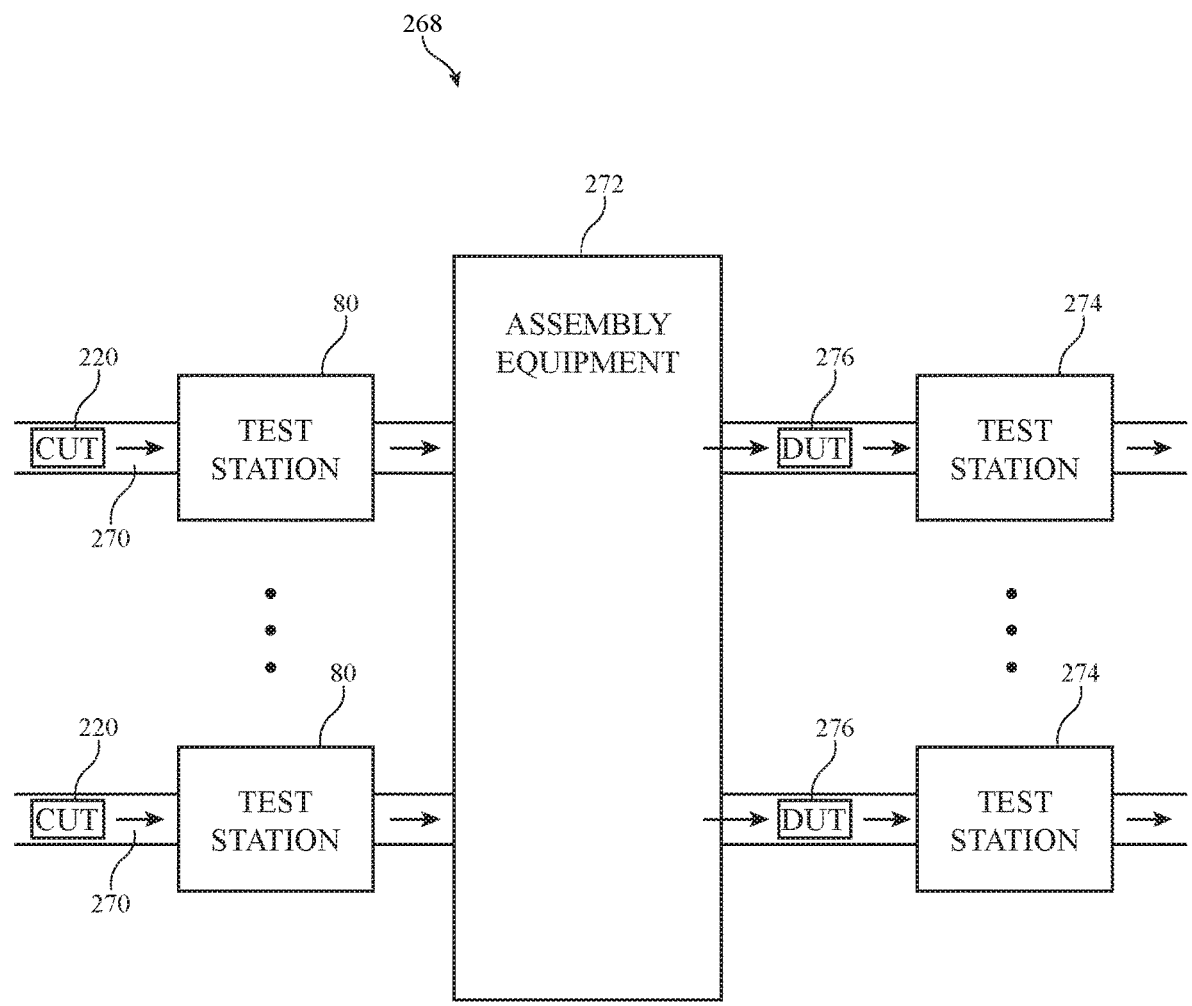
FIG. 9 is a diagram of an illustrative manufacturing and testing system for testing millimeter wave communications circuitry prior to assembly of the millimeter wave communications circuitry within an electronic device in accordance with an embodiment.

FIG. 9 shows an illustrative manufacturing system that may be used to test and assemble millimeter wave circuitry 28 within completed devices 10. As shown in FIG. 9, manufacturing system 268 may manufacture a number of electronic devices 10 simultaneously (e.g., many electronic devices 10 may each be assembled on a respective assembly line in parallel). Manufacturing system 268 may manufacture electronic devices 10 by assembling different components within production devices (e.g., components such as millimeter wave circuitry 28, etc.). Manufacturing system 268 may test the performance of components for use in electronic devices 10 (e.g., by gathering performance metric data from CUTs 220) using one or more millimeter wave test systems 80 (sometimes referred to herein as test stations).

In order to test the performance of many millimeter wave CUTs 220 for use in electronic devices 10 simultaneously, manufacturing system 268 may include a number of assembly lines 270 that each convey a respective CUT 220 to test stations 80 in parallel. Test stations 80 may gather EHF performance metric data associated with CUTs 220 and may process the EHF performance metric data to characterize the EHF performance of CUTs 220 (e.g., as shown in FIG. 6 and while processing step 174 of FIG. 4). Test stations 80 may be set using calibration settings identified for the particular design of CUT 220. The calibration settings may be generated using a single (master or reference) test station 80 that transmits EHF test signals through a reference circuit 90 that includes the same phase shifter and antenna design as the CUTs 220 (e.g., as shown in FIG. 3 and while processing step 170 of FIG. 4).

CUTs 220 that have sufficient EHF performance may be conveyed to assembly equipment 272 via assembly lines 270 for further assembly, whereas failing components may be discarded or reworked. CUTs 220 that have passed testing may sometimes be referred to as millimeter wave transceiver circuitry 28 (e.g., because the millimeter wave circuitry has finished testing and is no longer "under test"). Assembly equipment 272 may further assemble circuits 220 (e.g., millimeter wave transceiver 28) to produce DUTs 276. Assembly equipment 272 may, for example, modify circuitry 28, attach circuitry 28 to additional components, combine multiple, place circuitry 28 within housing 12 or the form factor of device 10, etc. In one suitable example, DUTs 276 may be a fully assembled and completed device 10.

DUTs 276 may be conveyed to additional test stations 274 for performing additional testing if desired. Test station 274 may perform additional testing (e.g., radio-frequency testing, stress testing, software testing, mechanical testing, or any other desired testing) on DUTs 276 (e.g., while processing step 178 of FIG. 4). If DUTs 276 exhibit satisfactory performance during testing, the DUTs may be labeled as passing devices. If DUTs 276 exhibit unsatisfactory performance during testing, the DUTs may be labeled as failing devices and may be disassembled, reworked, discarded, scrapped. Failing devices may be reworked without reworking millimeter wave transceiver circuitry 28, because any failure of DUTs 276 at test station 274 will be due to factors other than unsatisfactory performance of circuitry 28 (e.g., because satisfactory performance of circuitry 28 has already been verified at test stations 80). The passing DUTs may be provided to additional assembly equipment, additional testing equipment, or elsewhere. In the example where DUTs 276 are fully-assembled devices 10, DUTs 276 that have passed testing at test station 274 may be provided to an end user or other customer.

The foregoing is merely illustrative and various modifications can be made by those skilled in the art without departing from the scope and spirit of the described embodiments. The foregoing embodiments may be implemented individually or in any combination.

What is claimed is:

1. A test system for performing wireless testing operations on communications circuitry, the test system comprising:
   a substrate;
   an array of antennas on the substrate, wherein the array of antennas wirelessly receives test signals from the communications circuitry at a millimeter wave frequency;
   a signal analyzer;
   a transmission line coupled between the substrate and the signal analyzer, wherein the transmission line conveys the test signals received by the array of antennas to the signal analyzer, and the signal analyzer receives the test signals at the millimeter wave frequency, wherein the signal analyzer is configured to gather information from the received test signals; and computing equipment, wherein the computing equipment is configured to identify radio-frequency performance metric data based on the information gathered by the signal analyzer, and the computing equipment is further configured to determine whether the communications circuitry has satisfactory performance based on the identified radio-frequency performance metric data.

2. The test system defined in claim 1, further comprising:
phase-shifting circuitry on the substrate, wherein the phase-shifting circuitry conveys the test signals from the array of antennas to the transmission line.

3. The test system defined in claim 2, further comprising:
conductive traces on the substrate, wherein the conductive traces are coupled between the phase-shifting circuitry and the transmission line.

4. The test system defined in claim 3, further comprising:
switching circuitry interposed on the conductive traces; and
control circuitry on the substrate, wherein the control circuitry is configured to control the switching circuitry to couple a single antenna in the array of antennas to the transmission line at a given time.

5. The test system defined in claim 4, wherein the control circuitry is configured to provide a control signal to the phase-shifting circuitry that controls the phase shifting circuitry to provide a selected phase shift to the test signals received by the array of antennas.

6. The test system defined in claim 1, wherein the array of antennas wirelessly receives the test signals from the communications circuitry via near field electromagnetic coupling.

7. The test system defined in claim 1, further comprising:
a test fixture, wherein the test fixture is configured to hold the array of antennas at a selected distance from an additional array of antennas in the communications circuitry.

8. The test system defined in claim 7, wherein the selected distance is greater than zero mm and less than a wavelength of the test signals.

9. The test system defined in claim 1, wherein the information gathered by the signal analyzer comprises a magnitude and a phase of the test signals received at the signal analyzer.

10. The test system defined in claim 9, wherein the radio-frequency performance metric data comprises attenuation information and phase discontinuity information that is generated by the computing equipment based on the magnitude and phase of the received test signals.

11. The test system defined in claim 1, further comprising:
alignment structures on the substrate, wherein the alignment structures align each antenna in the array of antennas with a corresponding antenna in an additional array of antennas in the communications circuitry.

12. The test system defined in claim 11, wherein the alignment structures comprise a magnet that surrounds the array of antennas on the substrate.

13. The test system defined in claim 1, wherein the test signals are not down-converted to a frequency that is lower than the millimeter wave frequency prior to being received at the signal analyzer.

14. The test system defined in claim 1, wherein the millimeter wave frequency is greater than 27 GHz.

15. A method of operating a millimeter wave test system, the method comprising:
with a first reference circuit formed on a first substrate, wirelessly transmitting millimeter wave test signals to a second reference circuit formed on a second substrate;
with the second reference circuit, conveying the millimeter wave test signals to a signal analyzer that is external to the first and second substrates;
with the signal analyzer, gathering measurement data from the millimeter wave test signals received from the second reference circuit;
with computing equipment, generating calibration settings for the millimeter wave test system based on the measurement data gathered by the signal analyzer, wherein the millimeter wave test system further comprises a signal generator and a transmission line that are external to the first and second substrates;
with the signal generator, generating the millimeter wave test signals; and
with the transmission line, conveying the millimeter wave test signals from the signal generator to the first reference circuit.

16. The method defined in claim 15, further comprising:
loading the first and second reference circuits into a test fixture; and
with the test fixture, adjusting a distance between the first and second reference circuits, wherein the first reference circuit wirelessly transmits the millimeter wave test signals to the second reference circuit both before and after adjusting the distance between the first and second reference circuits.

17. The method defined in claim 15, wherein generating the calibration settings comprises generating a setting that identifies a phase shift, and the first reference circuit comprises phase shifting circuitry that applies the phase shift to the millimeter wave test signals prior to transmitting the millimeter wave test signals to the second reference circuit.

18. The method defined in claim 15, wherein the first reference circuit comprises an array of antennas and control circuitry formed on the first substrate, the method further comprising:
with the control circuitry, selecting an antenna in the array of antennas; and
with the selected antenna, transmitting the millimeter wave test signals to the second reference circuit.

19. The method defined in claim 18 further comprising:
with the control circuitry, selecting an additional antenna in the array of antennas; and
with the selected additional antenna, transmitting the millimeter wave test signals to the second reference circuit.

20. The method defined in claim 15, wherein generating the millimeter wave test signals comprises generating the millimeter wave test signals at a frequency between 27 and 29 GHz, and gathering the measurement data comprises gathering the measurement data from the millimeter wave test signals at the frequency between 27 and 29 GHz.

21. The method defined in claim 15, wherein gathering the measurement data from the millimeter wave test signals comprises measuring an amplitude and a phase of the millimeter wave test signals.

22. The method defined in claim 15, wherein the second reference circuit comprises control circuitry and phase shifting circuitry formed on the second substrate, the method further comprising:
with the control circuitry, adjusting a phase shift provided by the phase shifting circuitry to the millimeter wave test signals, wherein the first reference circuit wirelessly transmits the millimeter wave test signals to the second reference circuit before and after adjusting the phase shift provided by the phase shifting circuitry.

23. A test system, comprising:
a first printed circuit board having a first array of antennas;
a second printed circuit board having a second array of antennas;
a test fixture configured to hold the first printed circuit board at a selected distance from the second printed circuit board, wherein the test fixture has alignment structures configured to align each antenna in the first array with a different respective antenna in the second array;
a signal generator coupled to the first printed circuit board by a first transmission line; and
a signal analyzer coupled to the second printed circuit board by a second transmission line, wherein the signal analyzer is configured to generate millimeter wave test signals that are conveyed to the first printed circuit board over the first transmission line, the first array of antennas is configured to wirelessly transmit the millimeter wave test signals to the second array of antennas, and the second transmission line is configured to convey the millimeter wave test signals from the second array of antennas to the signal analyzer.

24. The test system defined in claim 23, wherein the selected distance is greater than zero mm and less than 1.0 mm.

25. The test system defined in claim 23, further comprising:
a first set of phase shifter circuits formed on the first printed circuit board and coupled between the first array of antennas and the first transmission line; and
a second set of phase shifter circuits formed on the second printed circuit board and coupled between the second array of antennas and the second transmission line.

26. The test system defined in claim 25, wherein the signal generator and the signal analyzer are formed external to the first and second printed circuit boards.

27. The test system defined in claim 23, wherein the signal analyzer is configured to measure a magnitude of the millimeter wave test signals, the system further comprising:
computing equipment, wherein the computing equipment is configured to identify an attenuation of the millimeter wave test signals between the first and second arrays of antennas based on the magnitude of the millimeter wave test signals measured by the signal analyzer.

28. The test system defined in claim 23, wherein the second array of antennas includes the same number of antennas as the first array of antennas.

* * * * *